United States Patent [19]

Barlage

[11] 4,390,070
[45] Jun. 28, 1983

[54] SOIL WORKING MACHINE

[75] Inventor: Bruno Barlage, Riesenbeck, Fed. Rep. of Germany

[73] Assignee: H. Niemeyer Sohne GmbH & Co. KG, Riesenbeck, Fed. Rep. of Germany

[21] Appl. No.: 266,864

[22] Filed: May 26, 1981

Related U.S. Application Data

[63] Continuation of Ser. No. 81,993, Oct. 4, 1979, abandoned.

[51] Int. Cl.³ .............................................. A01B 19/06
[52] U.S. Cl. .................................................. 172/54.5
[58] Field of Search ................... 172/101, 102, 58, 96, 172/54, 48, 57, 107, 63, 53, 97, 54.5

[56] References Cited

FOREIGN PATENT DOCUMENTS 119184  11/1970  Denmark ............................ 172/102
2206433  8/1973  Fed. Rep. of Germany ........ 172/53
2703221  8/1978  Fed. Rep. of Germany ...... 172/101

OTHER PUBLICATIONS

Niemeyer Power Harrow Advertising Circular Model Nos. TE 250,300,350,400 & 450 1-1969.

Primary Examiner—Paul E. Shapiro
Attorney, Agent, or Firm—Sprung, Horn, Kramer & Woods

[57] ABSTRACT

A machine for cultivating the soil has a main transverse beam carrying a transverse tool-shaft driven to drive wobble bearings on the tool-shaft, thereby to oscillate a plurality of tool holders having lever arms guided for transverse swinging movement in the beam. The tool holders mount the tines by substantially U-shaped elements of spring metal, each having its arched portion pointing in the direction of travel with the lower free limb connected to a tine and the upper free limb connected to a lever. The U-shaped elements are configured at the arched portion to have a width such as to have the forward portions of the elements in the direction of travel sweep in their transverse rocking movement a virtually continuous area extending over substantially the entire width of the main beam.

1 Claim, 2 Drawing Figures

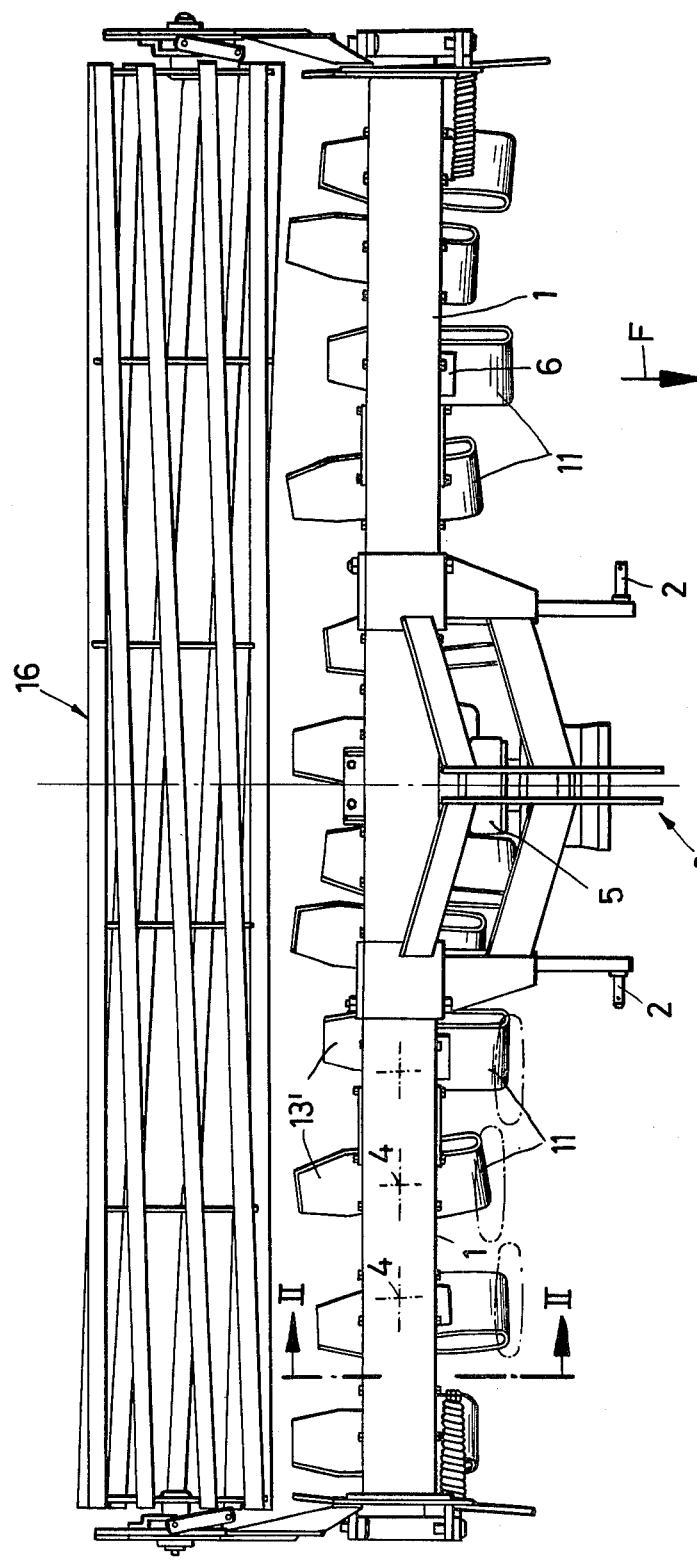

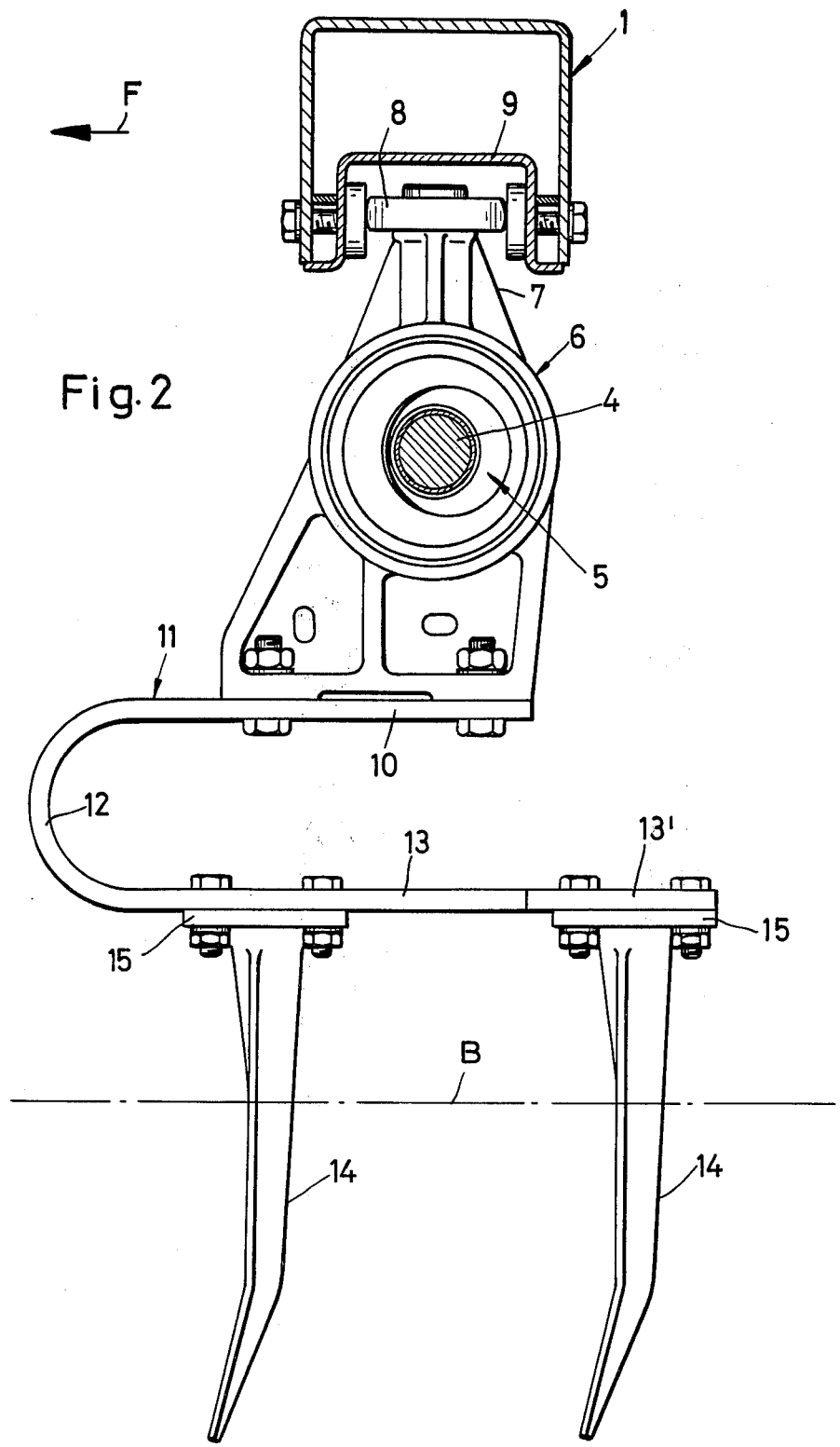

SOIL WORKING MACHINE

This is a continuation, of application Ser. No. 81,993 filed Oct. 4, 1979 now abandoned.

BACKGROUND OF THE INVENTION

The invention relates to a soil working machine having a machine beam extending substantially horizontally and transversely of the direction of movement, which can be attached to the three-point hydraulic hitch of a farm tractor or the like, having a transverse drive shaft mounted parallel to and at a distance below the beam, and a number of tumble or wobble bearings disposed in a spaced-apart relationship on the transverse drive shaft, on which levers are supported for a rocking movement transversely of the direction of travel, the levers having an upper lever arm guided by the machine beam for movement transversely of the direction of travel but secured against corotation with the transverse drive shaft and joined to downwardly directed, tooth-like soil working tools or tines.

SUMMARY OF THE INVENTION

It is the object of the invention to prevent, in such a machine, the entry of large stones between the springs and to assure that such solid bodies lying on or in the surface of the soil will reliably be made to pass through the area of operation of the spike-like soil working tools.

For this purpose, according to the invention, the arches of the springs are of a semicylindrical shape and of such a width that, in their rocking movement, the forward portions of the springs will sweep a virtually continuous surface extending approximately over the entire working width of the machine and at the same time the bottom limbs of the springs can have a portion which tapers rearwardly in width.

The springs, due to their configuration, form during their transverse rocking movements when in operation a more or less dynamically continuous deflector and depressor which, in view of the rate of the transverse rocking movements, is impenetrable at least to the large stones and clods of earth, and forces them down and into the soil with the achievement of a leveling action, and thus securely brings them into the range of action of the spike-like soil working tools. In this range, the earth clods are broken up by the tools, while the stones can pass between the tools. The forward, semicylindrically shaped arch of the spring is so stable in its shape, on account of its width, that any very small stones or earth clods that might still pass between the arches of the springs will be crushed by the springs without doing damage thereto.

BRIEF DESCRIPTION OF THE DRAWINGS

An embodiment of the subject matter of the invention is represented in greater detail in the drawing, wherein FIG. 1 is a top plan view of a machine in accordance with the invention, and FIG. 2 is an enlarged cross-sectional view taken along line II—II of FIG. 1.

DETAILED DESCRIPTION OF THE INVENTION

The machine represented in FIGS. 1 and 2 comprises a beam 1 extending substantially horizontally and transversely of the direction of travel F at a distance above the level of the soil B. The beam 1, as it can be seen in FIG. 1, is provided with connections 2 and 3 for attachment to the three-point hydraulic hitch of a farm tractor, which is not shown. Underneath the machine beam 1 there is mounted a transverse drive shaft 4 disposed parallel to it, which can be driven by a transmission 5, whose input is connected to the power take-off shaft, not shown, of the farm tractor carrying the machine. On the transverse drive shaft 4 there is disposed a plurality of tumble bearings 17 on each of which a lever 6 is supported for a rocking movement transversely of the direction of travel F. The levers 6 have an upper portion 7 guided by the beam 1 for movement transversely of the direction of travel but secured against corotation with the transverse drive shaft 4, and having a guiding roller 8 at its upper end, which can roll in a channel 9 in and along the underside of the beam 1. On its bottom end the lever 6 is bolted to the upper limb 10 of a flat-steel spring 11 which is substantially U-shaped and has an approximately semicylindrical arch 12. At its bottom limb 13, the spring 11 has downwardly pointing, spike-like soil working tools or tines 14 whose flat tops are bolted to the bottom limb 13 of the spring 11. The levers 6, the springs 11 and the soil working tools 14 form tool units, of which, in the embodiment represented in FIG. 1, there are twelve situated side by side. Information concerning the design and operation of such machines can be found in the pending U.S. patent application Ser. No. 966,726 and 966,727.

The springs 11 are of such a width, at least in the portion between the arch 12 and the forward portion of their bottom limbs 13, that, by the transverse swinging movements of the springs, these forward portions of all springs together sweep a virtually continuous surface of the ground extending virtually over the entire working width of the machine, so that these forward portions of the springs act as an impenetrable wall which exercises on stones and clods of earth in and on the surface of the soil a downward deflecting action tending to bring them into the range of action of the soil working tools 14. The continuity of the sweep of the spring 11 is visually represented by the elliptical broken lines in the forward area of three of the springs in FIG. 1.

To prevent the trailing ends of the bottom limbs 13 of the springs 11 from interfering with one another in their transverse rocking movements, these limbs 13 are made with their rearward portion 13' tapering in width toward the rear.

In the illustrated example, the soil working machine is provided with a soil loosener 16 trailing in the direction of travel F, which is constructed as a drag attached to the machine beam 1.

What is claimed is:

1. A machine movable in a given direction of travel for cultivating soil, comprising; a main beam extending substantially horizontally and transversely with respect to the direction of travel of a machine, a drive shaft mounted parallel to and spaced below the beam; a plurality of wobble bearings disposed spaced apart side-by-side on the drive shaft; a plurality of tool holders each supported on one of the wobble bearings and each comprising a lever guided for a rocking movement transversely of the direction of travel, at least one tine for each tool holder and means mounting the tines to the levers for sweeping a virtually continuous area extending over substantially the entire width of the main beam thereby coacting to form an impenetrable wall which exercises a downward deflecting action on stones or clods of earth at the surface of the soil to bring same into the range of the tines, the mounting means comprising a plurality of substantially U-shaped elements of spring metal each having its arch pointing in the direction of travel with the lower free limb connected to a tine and the upper free limb connected to a lever and configured at the arched portion to have a width which is about half the width of the swept area such that in their transverse rocking movement the forward portions of the elements in the direction of travel sweep a virtually continuous area extending over substantially the entire width of the main beam and wherein the lower free limb of each element has a rearward portion which tapers in width in a decreasing manner in a direction opposite to the direction of travel.

* * * * *